UNITED STATES PATENT OFFICE.

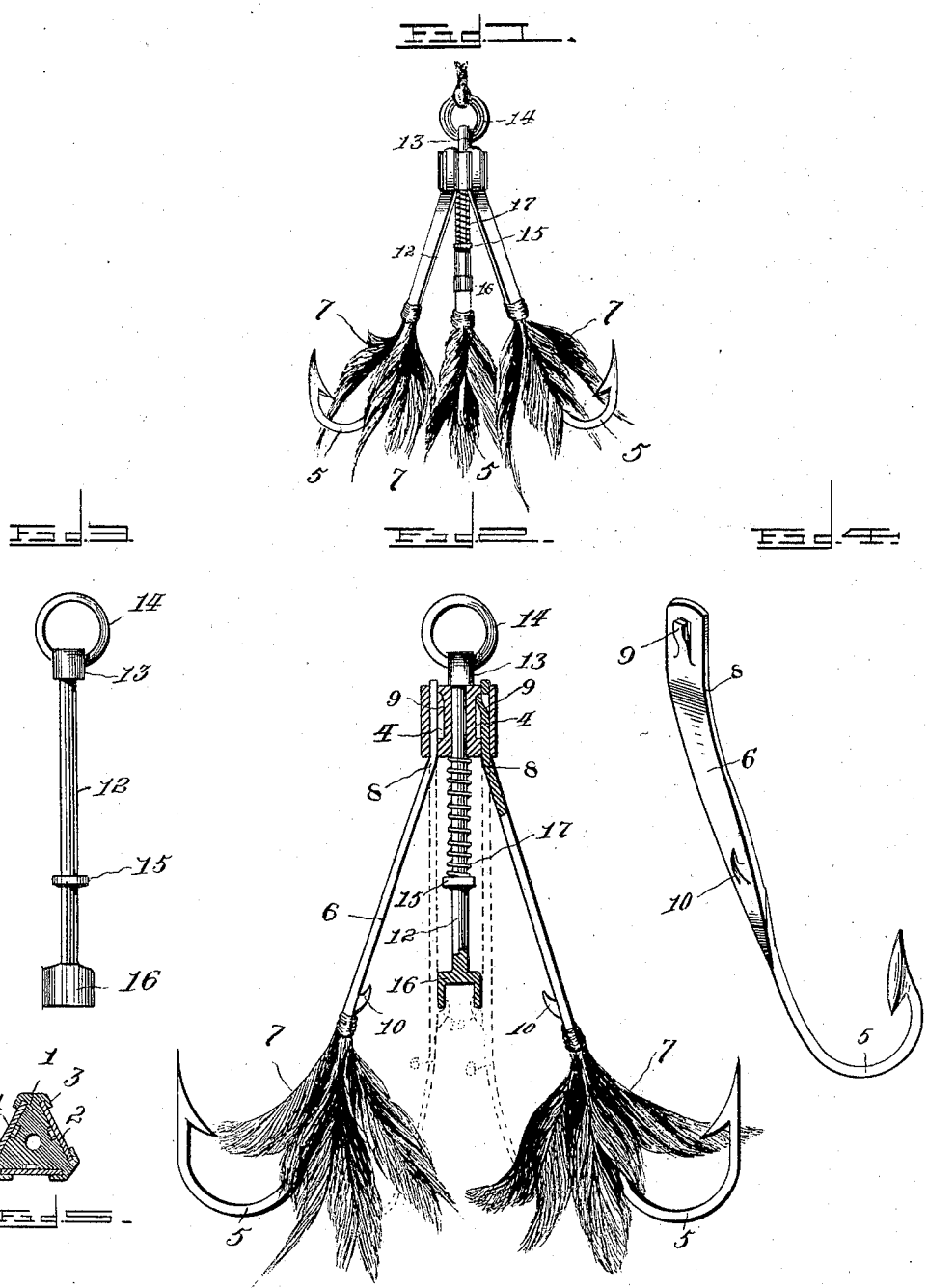

CHARLES B. CARPENTER, OF WATERTOWN, NEW YORK, ASSIGNOR OF TWO-THIRDS TO GEORGE LYMAN AND WILLIAM J. GRUPE, OF SAME PLACE.

FISH-HOOK.

SPECIFICATION forming part of Letters Patent No. 647,076, dated April 10, 1900.

Application filed November 27, 1899. Serial No. 738,402. (No model.)

*To all whom it may concern:*

Be it known that I, CHARLES B. CARPENTER, a citizen of the United States, residing at Watertown, in the county of Jefferson and State of New York, have invented a new and useful Fish-Hook, of which the following is a specification.

This invention relates to fish-hooks, and particularly to a spring-hook attachment for trolling-spoons; and the object of the same is to provide a plurality of hooks which are held in normal position by spring-arms having projections adapted to be engaged by a plunger to set or close the same and released by the fish biting the bait carried thereby or attacking the fly or flies carried thereby, and especially adapted for catching large fish, the improved construction being designed to render devices of this character more sure and certain in action or capable in every instance of catching and holding the fish securely the moment it takes the bait-hook and points or barbs into its mouth and pulls slightly upon the same.

With these and other objects in view the invention consists in the construction and arrangement of the several parts, which will be more fully hereinafter described and claimed.

In the drawings, Figure 1 is an elevation of the improved attachment, showing the hooks open or spread apart from each other. Fig. 2 is a section through the improved device, on a larger scale, showing the hooks open in full lines and held inward in set position in dotted lines. Fig. 3 is a detail elevation of the plunger forming a part of the attachment. Fig. 4 is a detail perspective view of one of the hooks and its spring-arm. Fig. 5 is a horizontal section taken through the head of the attachment and showing the upper extremities of the arms in position therein.

Similar numerals of reference are employed to indicate corresponding parts in the several views.

The numeral 1 designates a head, which, as clearly shown by Fig. 5, is approximately of triangular form, this shape being preferred; but it will be understood that other contours may be used if desired. The head 1 has grooves 2 formed in its faces and extending vertically thereover and opening out at the upper and lower ends, the said grooves being provided with inwardly-projecting side flanges 3, which act as keepers, and within the said grooves are counter-recesses 4, for a purpose which will be presently set forth. To correspond with the shape of the head 1 and affording means for obtaining the best results three hooks 5 are employed and have secured thereto arms 6, which are reduced in width toward their points of attachment to the shanks of the hooks, and, as illustrated, the latter have feather flies 7, which may be made to simulate any kind of insect desired, and at times artificial bait or live bait may be readily substituted therefor, or hooks 5 with arms 6 may be used in a clean state or without attached devices. Each of the arms 6, as clearly shown by Fig. 4, has an intermediate bend 8 to give it an outward projection, said bend being located nearer the upper terminal, and the upper extremity of each arm is also wide enough to prevent it slipping through the groove 2 in the head 1, in which it is mounted, when applied in operative position. The width of the upper extremity of each arm 6 obstructs its downward movement, and to prevent upward movement of the same an inwardly-directed spring-tongue 9 is provided in the upper extremity, which presses into the counter-recess 4, as clearly shown in Fig. 2. The arms 6, however, may be easily removed from or applied to the head 1 by pushing them upwardly until the lower reduced portion adjacent the upper terminal of the hook-shank in each instance arrives in the groove 2, and in view of the fact that the lower reduced extremity of the arm is of less width than the transverse extent of the groove or the distance between the inner opposing edges of the flanges 3 the said arm may be easily drawn outward from the head or as readily applied by pushing the said reduced portion of the arm into the groove.

The mode of securing the upper terminal of the hook-shank to the lower extremity of the arm is not materially essential as long as a firm joint is established; but in the said securement the disposition of a catch-spring 10 is included, all of said spurs being located at the same elevation on the arm or at an equal distance from the lower end of the head 1. Slidingly mounted in an opening 11, extending vertically through the center of the head 1, is a plunger 12, provided with an upper stop 13, adapted to bear against the top of the head and having therein a ring or eye 14 for attachment of the spoon-screws or other means of connecting the spoon to the plunger. At an intermediate point the said plunger 12 is also provided with a stop-collar 15, and at the lower extremity of the plunger, below the collar, a cup or socket 16 is located and opens out at the bottom. Surrounding the plunger between the collar 15 and the lower end of the head 1 is a spring 17, which acts to pull the plunger downwardly as far as permitted by the stop 13, and so retain it in this normal position.

In setting the improved attachment the arms 6 are drawn inwardly, as shown in dotted lines in Fig. 2, the plunger 12 being first drawn upwardly through the head, so as to bring the lower end of the cup or socket 16 above the plane of the catch-spurs 10, and if the said arms are close enough together a release of the plunger will cause the cup or socket thereof to engage all the spurs simultaneously, and thereby lock the arms and the hooks carried thereby in close assemblage. In this condition the attachment is arranged for use, and during trolling if a fish strike or attack the bait or fly, as the case may be, and receive the hooks in its mouth a slight pull on the said arms will move the head 1 on the plunger and release the cup or socket 16 from the spurs 10, thereby permitting the hooks to fly outwardly, as shown by Figs. 1 and 2 in full lines, and effectually hold the fish securely against accidental disengagement or release by struggle. The resistance offered by the fish to landing ordinarily institutes a severe strain on the line; but it will be observed in this construction also that there will be a slight yielding action of a cushion nature owing to the movement of the head 1 on the plunger and against the spring 17.

The device is simple in its construction and operation and can be easily arranged in connection with a spoon, and by its use many advantages will appear aside from those enumerated. Though the preferred embodiment of the invention has been shown and described, it will be understood that changes in the form, proportions, and minor details may be resorted to without departing from the principle or sacrificing any of the advantages of the invention.

Having thus described the invention, what is claimed as new is—

1. An attachment of the character set forth, comprising a head, spring-arms connected to said head and provided with inwardly-extending catch spurs or hooks, and a plunger under spring tension having a lower socket to engage the said catch-spurs and hold the arms inwardly in close relation, said arms being automatically released by a pull thereon.

2. In an attachment of the character set forth, the combination of a head, yielding arms carrying hooks removably applied to said head, and means for holding the said arms in close relation.

3. An attachment of the character set forth, comprising a head having grooves therein, and hooks having yielding arms removably mounted in the said grooves, the lower extremities of the arms being reduced.

4. An attachment of the character set forth, comprising a head having grooves therein and counter depressions, and hooks having yielding arms, and spring-tongues at the upper extremities of the arms to engage said counter-recesses, the arms being removable from the grooves and having lower reduced extremities to facilitate such removal or the application of the same.

5. An attachment of the character set forth, comprising a head with a series of grooves therein, a series of yielding arms removably mounted in said grooves and having hooks at their lower extremities, the said lower extremities of the arms being reduced and provided with inwardly-extending catch projections, and a spring-actuated plunger slidingly mounted in the said head and having a socket on its lower terminal to removably engage the said catch projections.

In testimony that I claim the foregoing as my own I have hereto affixed my signature in the presence of two witnesses.

CHARLES B. CARPENTER.

Witnesses:
JOSEPH ATWELL,
JOHN R. ROGERS.